United States Patent
Dahn et al.

[11] Patent Number: 5,907,899
[45] Date of Patent: Jun. 1, 1999

[54] METHOD OF FORMING ELECTRODES FOR LITHIUM ION BATTERIES USING POLYCARBOSILANES

[75] Inventors: Jeffery Raymond Dahn, Surrey; Alf M. Wilson, Vancouver; Weibing Xing, Burnaby, all of Canada; Gregg Alan Zank, Midland, Mich.

[73] Assignee: Dow Corning Corporation, Midland, Mich.

[21] Appl. No.: 08/661,531

[22] Filed: Jun. 11, 1996

[51] Int. Cl.$^6$ ...................................................... H01M 4/04
[52] U.S. Cl. ........................ 29/623.1; 501/88; 252/182.1
[58] Field of Search ..................... 252/182.1; 29/623.1; 501/88

[56] References Cited

U.S. PATENT DOCUMENTS 5,587,256  12/1996  Wilson et al. .

FOREIGN PATENT DOCUMENTS 0582173  2/1994  European Pat. Off. .
0685896  4/1995  European Pat. Off. ......... H01M 4/58
0692833  6/1995  European Pat. Off. ......... H01M 4/58

OTHER PUBLICATIONS

Solid State Ionics, "Lithium insertion in pyrolyzed siloxane polymers" Wilson et al, 74(1994) 249–254.

J. Electrochem, "Dramatic Effect of Oxidation on Lithium Insertion in Carbons Made from Epoxy Resins" Xue et al, vol. 142, No. 11 Nov., 1995, pp. 3668–3677.

J. Electrochem, "An Epoxy–Silane Approach to Prepare Anode Materials for Rechargeable Lithium Ion Batteries" Xue et al, vol. 142 No. 9 Sep. 1995 pp. 2927–2935.

*Primary Examiner*—John S. Maples
*Attorney, Agent, or Firm*—Roger E. Gobrogge; Sharon K. Severance

[57] ABSTRACT

A lithium ion battery electrode formed by the pyrolysis of a polycarbosilane followed by introducing lithium ions. These electrodes can be used to form batteries with large capacities, low irreversible capacity, high density and good safety behavior.

14 Claims, No Drawings

METHOD OF FORMING ELECTRODES FOR LITHIUM ION BATTERIES USING POLYCARBOSILANES

BACKGROUND OF THE INVENTION

The present invention relates to a method of forming electrodes for rechargeable lithium ion batteries and the electrodes formed thereby. These electrodes can be used to form batteries with high capacities.

Lithium ion batteries are known in the art and are widely used as electric sources for lap top computers, cellular phones, camcorders and the like. They are advantageous in that they can provide high voltage, high energy density, small self-discharge, excellent long-term reliability and the like.

Rechargeable lithium ion batteries have a simple mechanism. During discharge, lithium ions are extracted from the anode and inserted into the cathode. On recharge, the reverse process occurs. The electrodes used in these batteries are very important and can have dramatic effects on the batteries' performance.

Positive electrodes known in the art for use in these rechargeable lithium ion batteries include metal chalcogenides, metal oxides, conductive polymers and the like. Negative electrodes (anodes) known in the art for use in rechargeable lithium ion batteries include compounds in which the lithium ion is incorporated into a crystal structure of inorganic materials such as $WO_2$, $Fe_2O_3$ and the like, and carbonaceous materials such as graphite and conductive polymers.

Properties which are desirable in electrode materials include 1) chemical inertness towards the other battery components such as the lithium ions, the electrolyte salts and the electrolyte medium; 2) the ability to store high quantities of lithium; 3) the ability to reversibly store or bind the lithium; 4) lithium storage that minimizes formation of metallic lithium clusters or agglomerates and, thus, minimizes safety concerns; and 5) a high density which allows for volume efficiency.

The electrodes to date, however, have not maximized these properties. For instance, while lithium metal provides the best electrode potential, large batteries constructed therewith have poor safety behavior. Likewise, while lithium alloys have reasonable electrode potentials and safety profiles, they often crack and fragment with the constant cycling of the battery.

The most desirable anode materials to date have been carbonaceous compounds such as graphite. Graphite is chemically inert, can bind reasonable amounts of lithium (cells with capacities of about 330 mAh/g of anode) with little being irreversible (about 10%), and it has a high density (about 2.2 $g/cc^2$, although in the electrode the density is about 1.2 $g/cc^2$). Cells with larger capacities, however, are often desired. References which discuss the use of graphite anodes include Dahn et al.; Science, 270, 590–3 (1995), Zheng et al., Chemistry of Materials, 8, 389–93 (1996); Xue et al.; J. of Electrochem. Soc., 142, 3668 (1995), Wilson et al.; Solid State Ionics, 74, 249–54 (1994), Wilson et al.; J. of Electrochem. Soc., 142, 326–32 (1995) and Xue et al.; J. of Electrochem. Soc., 142, 2927 (1995).

It has recently been suggested that the addition of boron, phosphorous or metals such as silicon to carbonaceous anodes can increase the capacity of the resultant batteries. Such batteries, however, have not achieved optimal results.

For instance, Tahara et al. in European publication 582,173 teach the use of a silicon oxide or a silicate as the negative electrode in a lithium ion battery. Similarly, Dahn et al. in European publication 685,896 teach the use of SiC containing materials as anodes in lithium ion batteries. These references, however, do not teach the methods claimed herein.

The present inventors have now discovered that lithium ion batteries containing electrodes made from preceramic polycarbosilanes can have many desirable properties heretofore unobtainable. For instance, such batteries can have large capacities with low irreversible capacity. In addition, these anode materials are chemically inert towards the other battery components, they minimize the agglomeration of lithium and they have a high density. Finally, these materials can be designed to have low hysteresis or a larger hysteresis. The Applicants herein postulate that the hysteresis of these materials may be valuable since it may reduce reaction rates between intercalated lithium and electrolyte under thermal abuse.

SUMMARY OF THE INVENTION

The present invention relates to a method of forming an electrode for a lithium ion battery. The method comprises first pyrolyzing a polycarbosilane to form a ceramic material. Lithium ions are then incorporated into the ceramic material to form the electrode.

DETAILED DESCRIPTION OF THE INVENTION

The present invention is based on the unexpected discovery that lithium ion batteries containing anodes derived from polycarbosilanes can provide the batteries with highly desirable properties. For instance, such batteries can have large capacities (the electrodes have the ability to store large quantities of lithium) with low irreversible capacity (the lithium is reversibly stored). In addition, these anode materials are chemically inert towards the other battery components, they minimize the agglomeration of lithium and they have a high density.

The electrodes of the present invention are formed from polycarbosilanes. These polymers may contain units of the type $[R^1R^2SiCH_2]$, $[R^1Si(CH_2)_{1.5}]$, and/or $[R^1R^2R^3SiCH_2]$ where each $R^1$, $R^2$ and $R^3$ is independently selected from the group consisting of hydrogen and hydrocarbons having 1–20 carbon atoms. The hydrocarbons include alkyl radicals such as methyl, ethyl, propyl etc., aryl radicals such as phenyl, and unsaturated hydrocarbon radicals such as vinyl. In addition, the above hydrocarbon radicals can contain hetero atoms such as silicon, nitrogen or boron. Suitable polymers are described, for instance, by Yajima et al. in U.S. Pat. Nos. 4,052,430 and 4,100,233, both of which are incorporated herein in their entirety. Polycarbosilanes containing repeating ($-SiHCH_3-CH_2-$) units can be purchased commercially from the Nippon Carbon Co.

The polycarbosilane may also be substituted with various metal groups such as boron, aluminum, chromium and titanium. The method used to prepare such polymers is not critical. It may be, for example, the method of Yajima et al. in U.S. Pat. Nos. 4,248,814, 4,283,376 and 4,220,600.

It should be noted that the term polycarbosilane as used herein is intended to include copolymers or blends of the above polycarbosilanes and other polymers are also useful herein. For instance, copolymers of polycarbosilanes and silalkylenes $[R_2Si(CH_2)nSiR_2O]$ (eg., silethylene), silarylenes (eg., silphenylene $[R_2Si(C_6H_4)nSiR_2O]$), siloxanes $[R_2SiO]$, silazanes, silanes $[R_2Si-SiR_2]$, organic polymers and the like can be used herein. Moreover, blends of polycarbosilanes and the above mentioned polymers are also useful herein.

Generally, the polycarbosilane should be capable of being converted to ceramic materials with a ceramic char yield greater than about 20 weight percent. However, those with higher yields, such as greater than about 30 weight percent, preferably greater than about 50 weight percent and more preferably greater than 70 weight percent, are often used.

The above polymers should generally provide a char with at least an excess of carbon (eg., >0.05 wt. % based on the weight of the char). Although not wishing to be bound by theory, it is thought that the excess carbon forms a continuous network for the lithium ions. Larger excesses of carbon (eg., >5 wt. %) are often preferred.

What is meant by "excess carbon" in this invention is the amount of free or excess carbon derived from the polycarbosilane (i.e., that not bound to Si or O) during pyrolysis expressed as a weight percentage based on the weight of the char.

The amount of free carbon derived from the polycarbosilane is determined by pyrolysis of the polymer to an elevated temperature under an inert atmosphere until a stable ceramic char is obtained. For purposes of this invention, a "stable ceramic char" is defined as the ceramic char produced at an elevated temperature (e.g., 700–1400° C.).

Both the ceramic yield and the silicon, oxygen and carbon content of the stable ceramic char are then determined. Using a composition rule of mixtures, the amount of excess carbon in the stable ceramic char can be calculated (the amount of "excess carbon" in the char is calculated by subtracting the theoretical amount of carbon bound to silicon from the total carbon present). The amount of excess carbon thus calculated is normally expressed as a weight percent based on the weight of the char derived from the polycarbosilane.

If the desired amount of free carbon cannot be incorporated into the polymer, an additional source of carbon may be added. Examples include elemental carbon, phenolic resin, coal tar, high molecular weight aromatic compounds, derivatives of polynuclear aromatic hydrocarbons contained in coal tar and polymers of aromatic hydrocarbons.

Generally, polycarbosilanes which contain phenyl groups are preferred since they add to the free carbon in the ceramic chars. Polycarbosilanes which contain vinyl groups are also preferred since vinyl groups attached to silicon provide a mechanism whereby the polymer can be cured prior to pyrolysis. Polycarbosilanes where R is almost exclusively methyl or hydrogen are generally not suitable for use in this invention without other carbon additives as there is insufficient free carbon in the resulting ceramic char.

The compositions of this invention may also contain curing agents which are used to crosslink the polymer prior to pyrolysis. These curing agents may be activated by heating the green body containing the curing agent to temperatures in the range of 50–300° C. (i.e., the activation of a free radical precursor) or they may be crosslinked at room temperature. Additionally, conventional condensation type curing and curing agents may also be used herein.

Curing agents are well known in the art. Examples include free radical precursors such as organic peroxides (dibenzoyl peroxide, bis-p-chlorobenzol peroxide, bis-2,4-dichlorobenzol peroxide, di-t-butyl peroxide, dicumyl peroxide, t-butyl perbenzoate, 2,5-bis(t-butylperoxy)-2,3-dimethylhexane and t-butyl peracetate); and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the polycarbosilane. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

Examples of crosslinking agents include, for example, polyfunctional organosilicon compounds such as silanes, silazanes or siloxanes. The preferred crosslinking agents are organosilicon compounds with Si—H or Si—Vi functional bonds.

The addition of other materials is also within the scope of this invention. For instance, it is within the scope of the invention to add fillers such as amorphous or ceramic powder (eg., colloidal silica, carbon etc.), solvents, surfactants or processing aids such as lubricants, deflocculants and dispersants.

The polycarbosilane and any optional ingredients are often cured prior to pyrolysis to increase the char yield. Curing procedures are well known in the art. Generally, such curing can be carried out by heating the article to a temperature in the range of about 50 to 450° C., preferably in an inert atmosphere such as argon or nitrogen.

The polycarbosilane is then pyrolyzed in an inert atmosphere and/or under vacuum to a temperature of 700° C. or more. The preferred pyrolysis temperature is about 800 to 1400° C.

Inert atmospheres are used during pyrolysis to prevent oxygen incorporation into the ceramic, or loss of carbon through combustion. For purposes of this invention, an inert atmosphere is meant to include an inert gas, vacuum or both. If an inert gas is used it may be, for example, argon, helium or nitrogen. If a vacuum is used it may be, for example, in the range of 0.1–200 torr.

If desired, however, a reactive gas such as silane, methane, $H_2$, $O_2$, or $NH_3$ may be used to chemically change the composition of the ceramic from that derived by pyrolysis in an inert atmosphere.

Pyrolysis may be performed in any conventional high temperature furnace equipped with a means to control the furnace atmosphere. Such furnaces are well known in the art and many are commercially available.

The temperature schedule for pyrolysis has been found to be important in the present invention. Generally, heating temperatures should be at a rate less than about 50 ° C. minute and preferably less than about 10 ° C./minute.

The resultant ceramics contain silicon, carbon, oxygen and/or hydrogen in a wide array of proportions, based on the composition of the polycarbosilane. For instance, the material can have a composition of:

$$SiO_xC_y$$

wherein x=0 to 4 and y=0 to 100. Although unaccounted for in this formula, hydrogen may also be present in small amounts (e.g., <5 wt. %).

As noted above, when these types of materials are used as electrodes in lithium ion batteries, they provide the batteries with many desirable properties. For instance, such batteries can have large capacities with low irreversible capacity. In addition, these anode materials are chemically inert towards the other battery components, they minimize the agglomeration of lithium and they have a high density. Finally, these materials can be designed to have low hysteresis or a larger hysteresis. The Applicants herein postulate that the hysteresis of these materials may be valuable since it may reduce reaction rates between intercalated lithium and electrolyte under thermal abuse.

It is often preferred to process the ceramic material which results from the above pyrolysis into a powder form for use in the electrodes. This can be accomplished by techniques known in the art such as grinding, milling spray drying and the like.

Alternatively, however, the polycarbosilane can be molded into the desired shape before pyrolysis followed by heating to produce the shaped electrode. For instance, the polycarbosilane can be polymerized to a gel particle and then pyrolyzed.

If a ceramic powder is used, it is often mixed with variety of conductive agents, diluents or binders to assist in forming the desired shape electrode. For instance carbon black conductive diluent, N-methylpyrollidone, cyclohexanone, dibutylpthallate, acetone, or polyvinylidene fluoride binder, polytetrafluorethylene dispersed in water as a binder or ethylene propylene diene terpolymer dissolved in cyclohexanone as a binder are within the scope of the invention.

Finally, lithium ions are incorporated into the electrode. This can occur prior to insertion of the electrode into the battery by, for instance, physically incorporating the lithium in the polycarbosilane prior to pyrolysis or by mixing the lithium in the powdered ceramic material.

Preferably, however, the lithium ions are inserted after the electrode is inserted into the battery. At such time, the battery is merely "charged" by placing both the electrode of the invention and a counter electrode of, for instance, lithium transition metal oxide such as $LiCoO_2$ in a litium ion conductive non-aqueous electrolyte and then applying a current in a direction which allows incorporation of the lithium ion into the electrode of the invention.

The electrodes of the present invention can be used in any battery configuration. The preferred battery of the present invention is the conventional spiral wound type in which a cathode and anode separated by a porous sheet are wound into a "jelly roll".

The cathodes typically comprise a suitable cathode material as described in the prior at (eg., as lithiated metal oxides) applied on the surface of aluminum foil. This is often accomplished by forming a slurry of the cathode material and a binder and/or diluent and then depositing the slurry on the foil. The diluent is dried leaving a thin film of the cathode material on the foil.

Anodes are formed in the same manner as the cathode except that the ceramic of the present invention is used as the anode material and a copper foil is used in place of the aluminum foil.

As noted above, a porous sheet such as a polyolefin material is placed between the cathode and the anode and the composition is then rolled. This "jelly roll" is inserted into a conventional battery can and the can is sealed with a header and a gasket.

Before the can is sealed, an appropriate electrolyte is added to fill the pores in the porous sheet and in the electrode themselves and connections are made between the anode and cathode and the external terminals.

Those skilled in the art will understand that the type and amount of the battery components will be chosen based on component material properties and the desired performance and safety requirements of the battery. Also, the battery is generally electrically conditioned (recharged) during its manufacture.

Other configurations or components are possible. For instance, coin cells or a prismatic format are within the scope of the present invention.

The following non-limiting examples are provided so that one skilled in the art will more readily understand the invention.

I. Battery Testing

Laboratory coin cell batteries were used to determine electrochemical characteristics. These were assembled using conventional 2325 hardware and with assembly taking place in an argon filled glovebox. For purposes of analysis the experimental electrode materials were used opposite a lithium metal electrode in these coin cell batteries. A stainless steel cap and a special oxidation resistant case comprise the container and also serve as negative and positive terminals respectively. A gasket is used as a seal and also serves to separate the two terminals. Mechanical pressure is applied to the stack comprising the lithium electrode, separator, and the experimental electrode by means of a mild steel disk spring and a stainless disk. The disk spring was selected such that a pressure of about 15 bar was applied following closure of the battery. A 125 $\mu$m thick foil was used as the lithium electrode. Celgard® 2502 microporous polypropylene film was used as the separator. The electrolyte was a solution of 1M $LiPF_6$ salt dissolved in a solvent mixture of ethylene carbonate and diethyl carbonate in a volume ratio of 30/70.

Electrodes of experimental material were made using a mixture of the powdered ceramic material plus Super S (trademark of Ensagri) carbon black conductive diluent and polyvinylidene fluoride (PVDF) binder (in amounts of about 5 and 10% by weight respectively to that of the sample) uniformly coated on a thin copper foil. The powdered sample and the carbon black were initially added to a solution of 20% PVDF in N-methylpyrollidone (NMP) to form a slurry with additional NMP added to reach a smooth viscosity. The slurry was then spread on pieces of copper foil using a small spreader, and the NMP evaporated at about 100° C. in air. Once the sample electrode was dried it was compressed between flat plates at about 25 bar pressure. Electrode squares, 1.44 $cm^2$, were then cut from the larger electrode. These electrodes were then weighed and the weight of the foil, the PVDF, and the carbon black were subtracted to obtain the active electrode mass.

After construction, the coin cell batteries were removed from the glove box, thermostated at 30±1° C., and then charged and discharged using constant current cyclers with a ±1% current stability. Data was logged whenever the cell voltage changed by more than 0.005 V. Currents were adjusted based on the amounts of active material and the desired test conditions. Normally currents of 18.5 mAh/g of active material were used.

Cells were normally discharged to 0.0 V and then charged to 3.0V. This is the 'first cycle'. The cells were similarly cycled two more times in succession. The capacity of the first discharge is designated $Qd_1$, the capacity of the first charge by $Qc_1$, etc. The reversible capacity is taken here to be $Qrev=(Qc_1+Qd_2)/2$. The irreversible capacity s taken to be $Qirr=Qd_1-Qc_1$.

II. Materials

All polycarbosilane materials were obtained from Nippon Carbon Company Ltd. Lupersol 101™ is 2,5-bis(t-butylperoxy)-2,3-dimethylhexane obtained from PennWalt Corp. and Dicup "R"™ is dicumyl peroxide obtained from PennWalt Corp.

Polymer pyrolysis was carried out in a Lindberg Model 54434 or similar tube furnace equipped with Eurotherm temperature controllers. In a typical pyrolysis a sample was weighed out (approximately 4.0 grams) and placed in an alumina boat and loaded into the furnace. The furnace was then purged with argon at a rate sufficient to achieve one turnover of the furnace atmosphere every 3 minutes. After purging 45 to 60 minutes the flow was reduced to allow for a turnover every 6 minutes and the temperature raised to a final temperature and held 60 minutes. The ceramic sample was then reweighed, and ground for testing and analysis.

III. Analysis

Solution NMR spectra were recorded on a Varian VXR400S or Varian 200 MHz instrument. Gel permeation chromatographic data were obtained on a Waters GPC equipped with a model 600E systems controller, model 410 differential refractometer detector interfaced to a Compaq 486/33 computer employing PE Nelson Turbochrom software; all values are relative to polystyrene standards. Thermal gravimetric analysis were recorded on an Omnitherm TGA 951 analyzer interfaced to an IBM PS/2-50 Z computer with Thermal Sciences software. Carbon, hydrogen and nitrogen analysis were done on a Perkin Elmer 2400 analyzer. Oxygen analysis were done on a Leco oxygen analyzer model RO-316 equipped with an Oxygen determinator 316 (Model 783700) and an Electrode furnace EF100. Silicon analysis was determined by a fusion technique which consisted of converting the solid to a soluble form and analyzing the solute for total silicon by Arl 3580 ICP-AES analysis.

The x-ray powder diffraction was carried out on a Siemens D5000 horizontal theta-theta automated goniometer, equipped with a sample spinner, low background sample holders, graphite monochromator, scintillation counter, long fine focus Cu tube, and computer controlled operation. The solid sample is always ground to a fine powder of −100 mesh & smaller without any grit feeling by using a boron carbide grinder to minimize the contamination from grinding. Scans are made at 1 degree 2-theta per minute from 6 to 80 2-theta with the x-ray tube operated at 40 kV & 30 mA.

IV. Example

EXAMPLES 1 and 2

Example 1 Polymer PCS. This material was polycarbosilane purchased from Nippon Carbon Company prepared by the thermal rearrangement of polydimethylsilane.

Example 2 Polymer Synthesis—PCS—OH This material was made by dissolving PCS purchased from Nippon Carbon (220 g) in tetrachloroethylene (2 Kg) in a 3 L three necked flask fitted with a magnetic stirring bar a water cooled condenser and an ebbulator tube. This mixture was then heated to 100–105° C. and oxygen added subsurface over a period of 12 h. The product (PCS—OH) was isolated by filtration and removal of the solvent by rotary evaporation. This material is soluble in most common organic solvents but crosslinks prior to melting.

Pyrolysis An aliquot of the polymer (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. PCS: Yield: 62.3%; % C: 35.8; % H: 0.65; % Si: 60.5; O:2.8. XRD analysis: SiC pattern with sharp reflection centered at about 36 and 44 degrees 2 theta. PCS—OH: Yield: 64.5%; % C: 31.0; % H: 0.00; % Si: 50.4; O: 9.6. XRD analysis: weak SiC pattern with sharp reflection centered at about 36 and 44 degrees 2 theta.

Battery Cell Testing An aliquot of the ceramic material was made into an electrode as described above and assembled into a test cell as described above. Pyrolysis Rate: 45° C./min.; PCS: Reversible Capacity: 14 mAh/g; Irreversible Capacity 15 mAh/g. PCS—OH: Reversible Capacity: 305 mAh/g; Irreversible Capacity 124 mAh/g. 5° C./min. Average charge voltage 1.07 V; PCS—OH: Reversible Capacity: 269 mAh/g; Irreversible Capacity 145 mAh/g; Average charge voltage 1.1 V.

EXAMPLE 3

Synthesis 25 g of PCS from Example 1 was blended with 25 g pitch in 250 g THF solutions containing 1% by weight (0.5 g) Lupersol 101™. The blend was isolated by removal of the solvent by rotary evaporation, and then crosslinked by heating to 200° C. for 30 minutes under argon.

Pyrolysis An aliquot of the polymer (ca. 4 g) was placed in a graphite crucible and heated under a continuous argon purge at 5° C./min to 1000° C. and held at temperature for one hours before cooling to ambient temperature. The ceramic yield was calculated and the sample analyzed as described above. Yield: 56.4%; % C: 58.8; % H: 0.46; % Si: 35.3% O: 1.9. XRD analysis: SiC pattern with sharp reflection centered at about 36 and 44 degrees 2 theta and a graphene pattern with a broad reflection centered at about 44 degrees 2 theta.

Battery Cell Testing An aliquot of the ceramic material was made into an electrode as described above and assembled into a test cell as described above. Pyrolysis Rate: 5° C./min.; Reversible Capacity: 282 mAh/g; Irreversible Capacity 96 mAh/g; Average charge voltage 0.71.

That which is claimed is:

1. A method of forming an electrode material for a lithium ion battery comprising:

(A) pyrolyzing a composition comprising a polycarbosilane containing repeating —SiHCH$_3$—CH$_2$— units to form a ceramic material; and (B) introducing lithium ions into the ceramic material to form an electrode material.

2. The method of claim 1 wherein the composition comprising the polycarbosilane is cured prior to pyrolysis.

3. The method of claim 1 wherein the composition comprising the polycarbosilane is pyrolyzed at a temperature in the range of 700 to 1400° C. at a rate of heating less than about 10° C./minute.

4. The method of claim 1 wherein the ceramic material is formed into a powder, the powder blended with a binder and a diluent to form a mixture and the mixture formed into the desired shape of the electrode before the lithium ions are introduced.

5. The method of claim 1 wherein pyrolysis of the polycarbosilane produces a ceramic material containing at least 0.5 weight percent excess carbon.

6. The method of claim 1 wherein the polycarbosilane has a char yield greater than about 50 weight percent.

7. The method of claim 1 wherein the composition comprising the polycarbosilane also contains a curing agent.

8. The method of claim 1 wherein the composition comprising the polycarbosilane also contains a carbonaceous material.

9. The method of claim 1 wherein the composition comprising the polycarbosilane also contains a filler.

10. The method of claim 1 wherein the polycarbosilane is a copolymer with a polymer selected from the group consisting of silalkylenes, silarylenes, silazanes, silanes, siloxanes and organic polymers.

11. The method of claim 1 wherein the polycarbosilane is blended with a polymer selected from the group consisting of silalkylenes, silarylenes, siloxanes, silazanes, silanes, and organic polymers.

12. The method as claimed in claim 1 wherein the polycarbosilane is polycarbosilane hydroxide.

13. The method as claimed in claim 8 wherein the carbonaceous material is pitch.

14. In a method of making a rechargeable lithium ion battery, the improvement comprising making an anode by a process comprising:

(A) pyrolyzing a composition comprising a polycarbosilane polymer containing repeating —$SiHCH_3$—$CH_2$— units to form a ceramic material; and (B) introducing lithium ions into the ceramic material to form an anode.

* * * * *